United States Patent
Hagen et al.

(10) Patent No.: US 6,995,354 B2
(45) Date of Patent: Feb. 7, 2006

(54) OPTOELECTRONIC SENSOR DEVICE

(75) Inventors: Frank Hagen, Lüdenscheid (DE); Thomas Weber, Lüdenscheid (DE); Jürgen Levers, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 158 days.

(21) Appl. No.: 10/989,949

(22) Filed: Nov. 15, 2004

(65) Prior Publication Data

US 2005/0092901 A1 May 5, 2005

Related U.S. Application Data

(63) Continuation of application No. PCT/EP03/05667, filed on May 30, 2003.

(30) Foreign Application Priority Data

Jun. 4, 2002 (DE) ......................................... 102 24 692

(51) Int. Cl.
*G02B 6/42* (2006.01)

(52) U.S. Cl. .................. 250/227.25; 250/238; 340/602; 73/29.05; 219/522

(58) Field of Classification Search ................ 250/239, 250/238, 574, 227.25; 356/436; 318/438, 318/DIG. 2; 388/916; 338/306–309; 340/602–604, 340/640; 52/171.2; 73/73, 29.05, 335.01; 219/201, 203, 209, 522, 543

See application file for complete search history.

(56) References Cited

U.S. PATENT DOCUMENTS

| | | | |
|---|---|---|---|
| 5,391,891 A | * | 2/1995 | Wiegleb et al. ............. 250/574 |
| 5,543,923 A | * | 8/1996 | Levers et al. ................ 356/445 |
| 5,639,393 A | * | 6/1997 | Veltum et al. ............... 219/209 |
| 5,804,817 A | | 9/1998 | Seiler et al. |
| 6,285,037 B1 | * | 9/2001 | Koyama et al. ............ 250/574 |
| 6,403,037 B1 | * | 6/2002 | Chang et al. .............. 422/68.1 |
| 6,490,926 B2 | * | 12/2002 | Tabota ...................... 73/514.34 |
| 6,831,288 B1 | * | 12/2004 | Schmitt et al. ............. 250/573 |
| 6,855,947 B2 | * | 2/2005 | Graves et al. .............. 250/573 |
| 2003/0160158 A1 | * | 8/2003 | Ishino et al. ............ 250/227.25 |

FOREIGN PATENT DOCUMENTS

| | | |
|---|---|---|
| DE | 42 02 121 C | 12/1992 |
| DE | 195 10 989 A1 | 10/1995 |
| DE | 197 34 833 C1 | 5/1999 |
| DE | 100 53 415 A1 | 5/2002 |
| JP | 2001324443 A * | 11/2001 |
| JP | 2001 324443 A | 4/2002 |

* cited by examiner

*Primary Examiner*—David Porta
*Assistant Examiner*—Davienne Monbleau
(74) *Attorney, Agent, or Firm*—Brooks Kushman P.C.

(57) ABSTRACT

An optoelectronic sensor device for detecting precipitation on an outer surface of a transparent pane. The sensor device includes a beam guide attached to an inner surface of the pane and a circuit board offset from the inner pane surface. A beam transmitter is arranged on the circuit board to transmit, along a transmission beam path, a light beam toward the pane via the beam guide. A beam receiver is arranged on the circuit board to receive, along a reception beam path, a light beam reflected from the outer surface of the pane via the beam guide. A circuit substrate, electrically connected to the circuit board, is arranged parallel to the pane between the pane and the circuit board. An installation space separates the circuit substrate from the inner pane surface. A heating device is arranged on the circuit substrate in an area lying outside of the beam paths.

20 Claims, 2 Drawing Sheets

OPTOELECTRONIC SENSOR DEVICE

CROSS-REFERENCE TO RELATED APPLICATIONS

This is a continuation of International Application PCT/EP03/05667, published in German, with an international filing date of May 30, 2003, which claims priority to DE 102 24 692.0 filed Jun. 4, 2002, which are both hereby incorporated by reference.

BACKGROUND OF THE INVENTION

1. Field of the Invention

The present invention generally relates to an optoelectronic sensor device for detecting the degree of precipitation wetting of a transparent pane in which the optoelectronic sensor device has a beam guide body associated with beam transmitters and receivers arranged on a main board and a heating device located in an area lying outside of the beam paths of the beam transmitters and receivers.

2. Background Art

Optoelectronic sensor devices are typically employed to influence a windshield washer system as a function of the amount of precipitation located on the windshield of a motor vehicle. Such devices generally employ a beam transmitter and a beam receiver. In operation, the beam transmitter is positioned to transmit a light beam towards the windshield. The windshield reflects the transmitted light beam as a function of the amount of precipitation on the windshield. The beam receiver is positioned to receive the reflected light beam. The amount of precipitation on the windshield is then determined as a function of the reflected light beam received by the beam receiver.

Commonly assigned U.S. Pat. No. 5,543,923 discloses an optoelectronic sensor device. This sensor device includes a beam guide body and associated pairs of beam transmitters and beam receivers. Pairs of lenses are arranged as part of the beam guide body. A first lense of each lense pair is associated with a respective beam transmitter and a second lense of each lense pair is associated with a respective beam receiver. In general, each beam transmitter transmits light beams to the windshield via the associated first lense and each beam receiver receives light beams reflected from the windshield via the associated second lense. As such, the first lenses serve to parallelize divergent light beam bundles transmitted from the associated beam transmitters and the second lenses serve to focus the parallel bundle of light beams reflected from the windshield onto the beam receivers.

This sensor device further includes a heating device. The heating device is arranged on a side of the beam guide body facing away from the windshield. The heating device is a positive temperature coefficient (PTC) thermistor or heating foil and is used to heat the sensor device in order to bring it to a sufficient operating temperature such as 40° C.

The heating device arrangement disclosed in U.S. Pat. No. 5,543,923 requires the use of relatively elaborate and costly special components. Further, this heating device arrangement results in blocking the penetration of ambient light into the inside of the sensor device over a relatively large area. Such ambient light blocking especially occurs in an effective design in which the heating device is flat and extends parallel to the windshield. The blocking of ambient light into optoelectronic sensor devices is undesirable at times. As such, in the case of a heating device arrangement blocking ambient light, the sensor device requires an ambient light receiving area that is located outside of the area shaded by the heating device. However, adding such an ambient light receiving area enlarges the total dimensions of the sensor device which is generally considered as being disadvantageous.

SUMMARY OF THE INVENTION

The optoelectronic sensor device in accordance with the present invention has the advantage that the heating device arrangement is relatively more cost-effective to produce and results in free space located in the immediate vicinity of the pane (i.e., the windshield) which can be used for accommodating additional components such as light sensors.

This is possible as the heating device is arranged on an additional circuit substrate that is arranged parallel to the surface of the pane and that is electrically connected with a main printed circuit board. An especially simple and effective heating device is formed by a resistance element placed on the circuit substrate, especially on the side of the circuit substrate facing away from the pane.

A plate-shaped ceramic substrate may be used as the circuit substrate because of its thermal stability and good printability, especially in the standard silk-screen printing process. A conventional rigid or flexible circuit board may also be used as the circuit substrate.

BRIEF DESCRIPTION OF THE DRAWINGS

Further advantageous embodiments of the present invention are explained in detail with reference to the sample embodiment shown in the Figures in which.

DETAILED DESCRIPTION OF THE PREFERRED EMBODIMENT(S)

Figure 1:
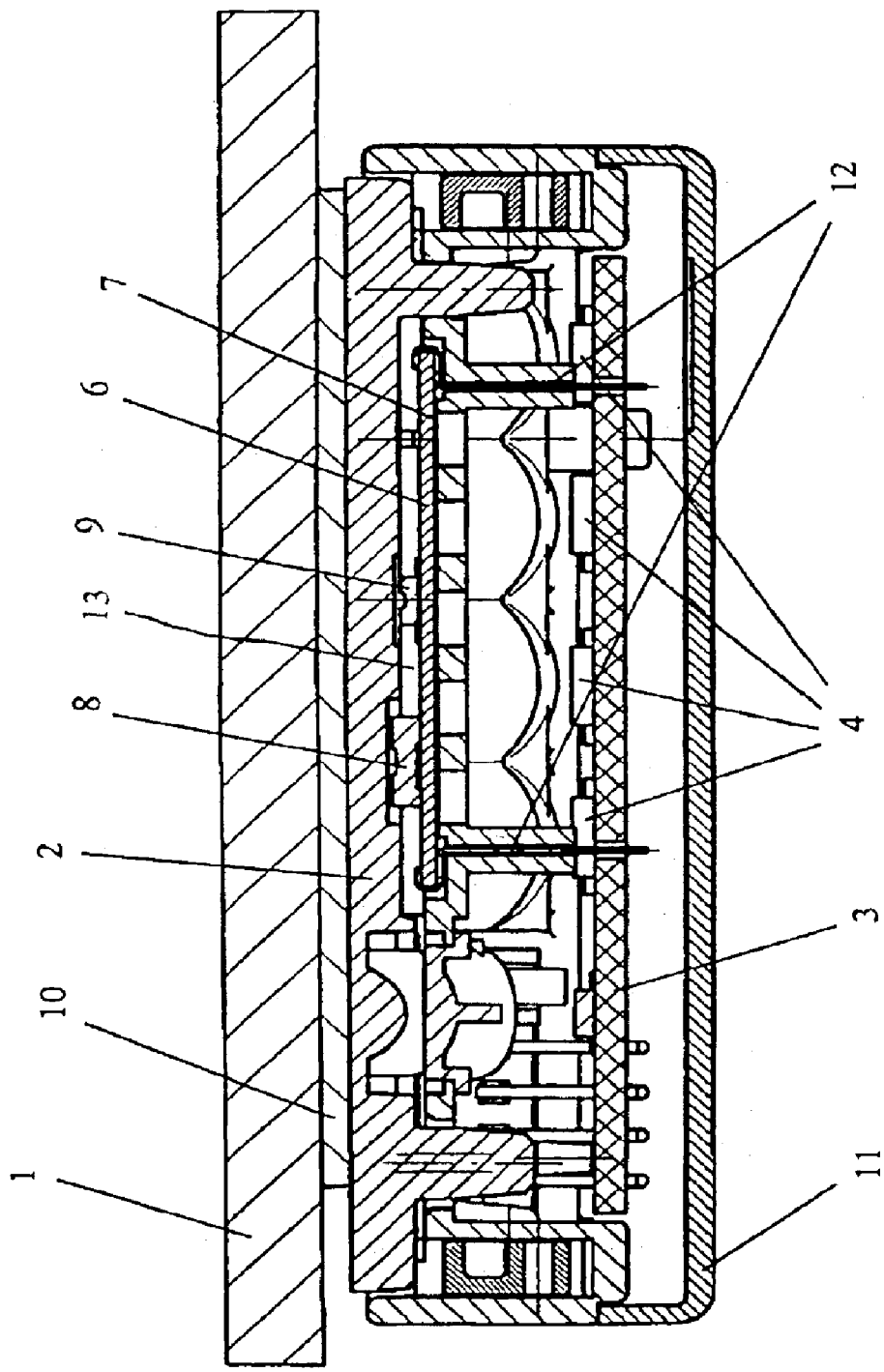
FIG. 1 illustrates an optoelectronic sensor device in accordance with an embodiment of the present invention in which the sensor device is shown in a section perpendicular to the surface of a pane.
Figure 2:
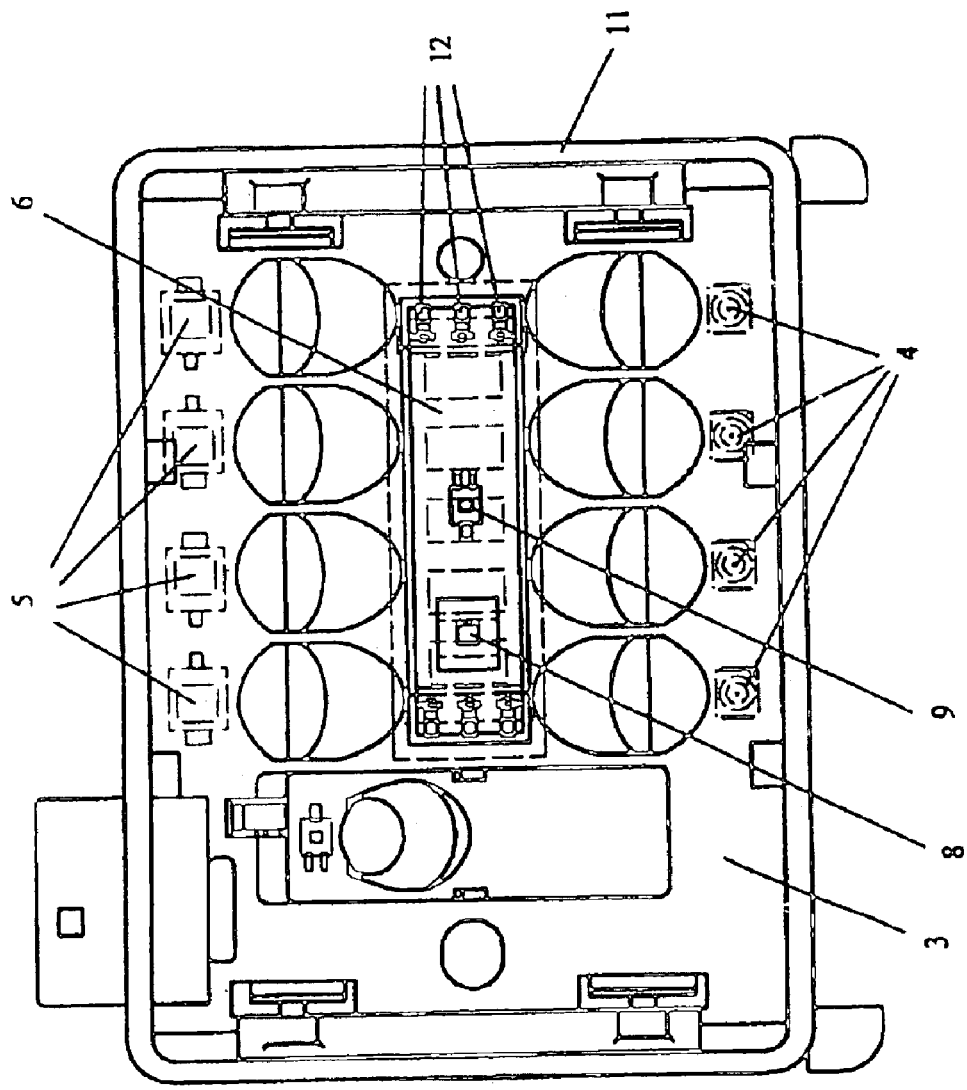
FIG. 2 illustrates the optoelectronic sensor device shown in FIG. 1 in which the sensor device is shown in a sectional view that is parallel to the surface of the pane.

Referring now to FIGS. 1 and 2, an optoelectronic sensor device for detecting the degree of wetting of a precipitation-covered transparent pane 1 in accordance with the present invention is shown. The optoelectronic sensor device generally includes a beam guide body 2, beam transmitters 4, and beam receivers 5. Beam guide body 2 guides light beams from beam transmitters 4 towards pane 1 and guides light beams reflected from the pane towards beam receivers 5.

To this end, beam guide body 2 includes pairs of optical lenses which are associated with respective pairs of beam transmitters and receivers 4, 5. A first lense of each pair of lenses parallelize divergent bundle beams transmitted from an associated beam transmitter 4 towards the outer surface of pane 1 for eventual receipt by the associated beam receiver 5. A second lense of each pair of lenses focus the parallel bundle of light beams reflected off of the outer surface of pane 1 onto the associated beam receiver 5.

An optical cement 10 fastens beam guide body 2 to the inside surface of pane 1. The inside surface of pane 1 is not exposed to precipitation. Pane 1 is preferably the windshield or rear window of a motor vehicle.

The optoelectronic sensor device is arranged within a housing 11. Housing 11 is placed on a portion of the inside surface of pane 1 which is exposed to ambient light. That is, on a portion of the inside surface of pane 1 whose view is not blocked and that is suitable for detecting precipitation.

Beam transmitters 4 and beam receivers 5 are arranged as surface mount device (SMD) components on a main printed circuit board 3. Circuit board 3 is positioned relative to beam guide body 2 through corresponding holes in the circuit board and domes on the beam guide body which cooperate with the holes.

The optoelectronic sensor device further includes a heating device 7. Heating device 7 is placed in the vicinity of pane 1 and functions to generate heat in order to remove any interfering dew on the outside surface of pane 1 and to raise the components of the optoelectronic sensor device to a sufficient operating temperature. Heating device 7 is a resistance element placed on a circuit substrate 6. Circuit substrate 6, for example, may be a rigid circuit board or a plate-shaped ceramic substrate.

Heating element 7 may be realized as a thick film structure printed on the side (i.e., the outer side) of circuit substrate 6 facing away from pane 1. Alternatively, resistance heating element 7 may be realized as SMD resistors—especially small ones—or as a balanced and thus self-regulating PTC system. A set of terminal pins 12 electrically connect circuit substrate 6 to main board 3. Heating current is applied to heating element 7 from main board 3 via terminal pins 12.

Because heating element 7 can be advantageously arranged on the outer side of circuit substrate 6 which is facing away from pane 1, other components can be placed on the side (i.e., the inner side) of the circuit substrate which is facing toward the pane. An installation space 13 separates the inner side of circuit substrate 6 from a portion of beam guide body 2 which is fastened to the inside surface of pane 1 as shown in FIG. 1. As shown in FIGS. 1 and 2, for example, two different beam sensors 8, 9 are placed on the inner side of circuit substrate 6 facing pane 1. Beam sensors 8, 9 are connected through track conductors that are present on the inner side of circuit substrate 6 with terminal pins 12 and thus with main board 3.

Beam sensors 8, 9 are components which may be used to control the sensitivity of the optoelectronic sensor device or which may be used to affect other devices of the motor vehicle such as lighting devices or an air conditioner. Sensors 8, 9 used for such purposes are especially those that have specific properties, for example, with regard to their spatial angle coverage or their spectral sensitivity.

The location on the inner side of circuit substrate 6 facing pane 1 is advantageous for sensors 8, 9 in several regards. For instance, in this location, the sensors are located in the immediate vicinity of pane 1 so that the incident light is optimal and this area of pane 1 is usually kept as clean as possible under all weather conditions. Moreover, circuit substrate 6 can have components on it which are also suitable for temperature measurement, for example. Such temperature measurement components can be provided to control heating device 7, for example. Arranging such temperature measurement components directly on circuit substrate 6 is optimally suitable to compensate for the temperature dependence of beam sensors 8, 9, for example. Laser trimmable thick film resistors printed on the inner side of circuit substrate 6 make possible adjustment which might be necessary in the operating points of the mentioned light-sensitive or temperature-sensitive components, for example, and do so in a manner that is favorable from a process engineering standpoint.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the invention.

What is claimed is:

1. An optoelectronic sensor device for detecting precipitation on an outer surface of a transparent pane, the device comprising:

a beam guide body attached to an inner surface of the pane;

a circuit board spaced apart from the inner surface of the pane;

wherein the beam guide body is positioned between the inner surface of the pane and the circuit board;

a beam transmitter arranged on the circuit board to transmit, along a transmission beam path, a light beam toward the pane via the beam guide body;

a beam receiver arranged on the circuit board to receive, along a reception beam path, a light beam reflected from the pane via the beam guide body;

a circuit substrate arranged parallel to the pane and in an area lying outside of the transmission and reception beam paths, the circuit substrate positioned between the beam guide body and the circuit board, the circuit substrate being spaced apart from the circuit board and being electrically connected to the circuit board to receive electrical current from the circuit board, the circuit substrate being separated from the beam guide body by an installation space; and a heating device arranged on the circuit substrate in an area lying outside of the transmission and reception beam paths, wherein the circuit substrate provides the electrical current received from the circuit board to the heating device, wherein the heating device converts the electrical current to heat.

2. The device of claim 1 wherein:

the heating device is a balanced and self-regulating positive temperature coefficient system placed on the circuit substrate.

3. The device of claim 1 wherein:

the heating device is a resistance element.

4. The device of claim 3 wherein:

the resistance element is a thick film print structure arranged on a side of the circuit substrate which faces the circuit board.

5. The device of claim 3 wherein:

the resistance element includes surface mount device resistors.

6. The device of claim 1 wherein:

the circuit substrate is one of a circuit board and a ceramic substrate.

7. The device of claim 1 further comprising:

at least one additional electronic component arranged on the circuit substrate within the installation space between the circuit substrate and the inner surface of the pane.

8. The device of claim 7 wherein:

the at least one additional electrical component is a temperature measurement component.

9. The device of claim 8 wherein:

the temperature measurement component is a structure printed on the circuit substrate.

10. The device of claim 7 wherein:

the at least one additional electrical component is a beam sensor.

11. The device of claim 10 wherein:

the beam sensor is associated with a laser trimmable resistor printed on the circuit substrate.

12. A method for detecting precipitation on an outer surface of a transparent pane, the method comprising:

attaching a beam guide body to an inner surface of the pane;

attaching a circuit board to the beam guide body such that the circuit board is spaced apart from the inner surface of the pane and such that the beam guide body is positioned between the inner surface of the pane and the circuit board;

arranging a beam transmitter on the circuit board to transmit, along a transmission beam path, a light beam toward the pane via the beam guide body;

arranging a beam receiver on the circuit board to receive, along a reception beam path, a light beam reflected from an outer surface of the pane via the beam guide body;

arranging a circuit substrate parallel to the pane and in an area lying outside of the transmission and reception beam paths and positioning the circuit substrate between the beam guide body and the circuit board such that the circuit substrate is separated from the beam guide body by an installation space and is spaced apart from the circuit board;

electrically connecting the circuit substrate to the circuit board to receive electrical current from the circuit board;

arranging a heating device on the circuit substrate in an area lying outside of the transmission and reception beam paths; and providing electrical current from the circuit board to the heating device via the circuit substrate for the heating device to use in order to generate heat.

13. The method of claim 12 wherein:

the heating device is a resistance element.

14. The method of claim 13 wherein:

arranging the heating device on the circuit substrate includes printing the resistance element on a side of the circuit substrate which faces the circuit board.

15. The method of claim 12 further comprising:

arranging at least one additional electronic component on the circuit substrate within the installation space between the circuit substrate and the inner surface of the pane.

16. The method of claim 15 wherein:

the at least one additional electrical component is a temperature measurement component, and arranging the temperature measurement component on the circuit substrate within the installation space includes printing the temperature measurement component on a side of the circuit substrate facing the inner surface of the pane.

17. The method of claim 15 wherein:

the at least one additional electrical component is a beam sensor.

18. An optoelectronic sensor device for detecting precipitation on an outer surface of a transparent pane, the device comprising:

a beam guide body attached to an inner surface of the pane;

a first circuit board spaced apart from the inner surface of the pane;

wherein the beam guide body is positioned between the inner surface of the pane and the first circuit board;

a beam transmitter arranged on the first circuit board to transmit, along a transmission beam path, a light beam toward the pane via the beam guide body;

a beam receiver arranged on the first circuit board to receive, along a reception beam path, a light beam reflected from the pane via the beam guide body;

a second circuit board arranged parallel to the pane and in an area lying outside of the transmission and reception beam paths, the second circuit board positioned between the beam guide body and the first circuit board, the second circuit board being spaced apart from the first circuit board and being electrically connected to the first circuit board to receive electrical current from the first circuit board, the second circuit board being separated from the beam guide body by an installation space; and a heating device arranged on the second circuit board in an area lying outside of the transmission and reception beam paths, wherein the second circuit board provides the electrical current received from the first circuit board to the heating device, wherein the heating device converts the electrical current to heat.

19. The device of claim 18 wherein:

the heating device is arranged on a side of the second circuit board which faces the first circuit board.

20. The device of claim 19 further comprising:

at least one additional electronic component arranged on a side of the second circuit board which faces the inner surface of the panel, wherein the at least one additional electronic component includes at least one of a temperature measurement component and a beam sensor.

\* \* \* \* \*